Patented June 9, 1925.

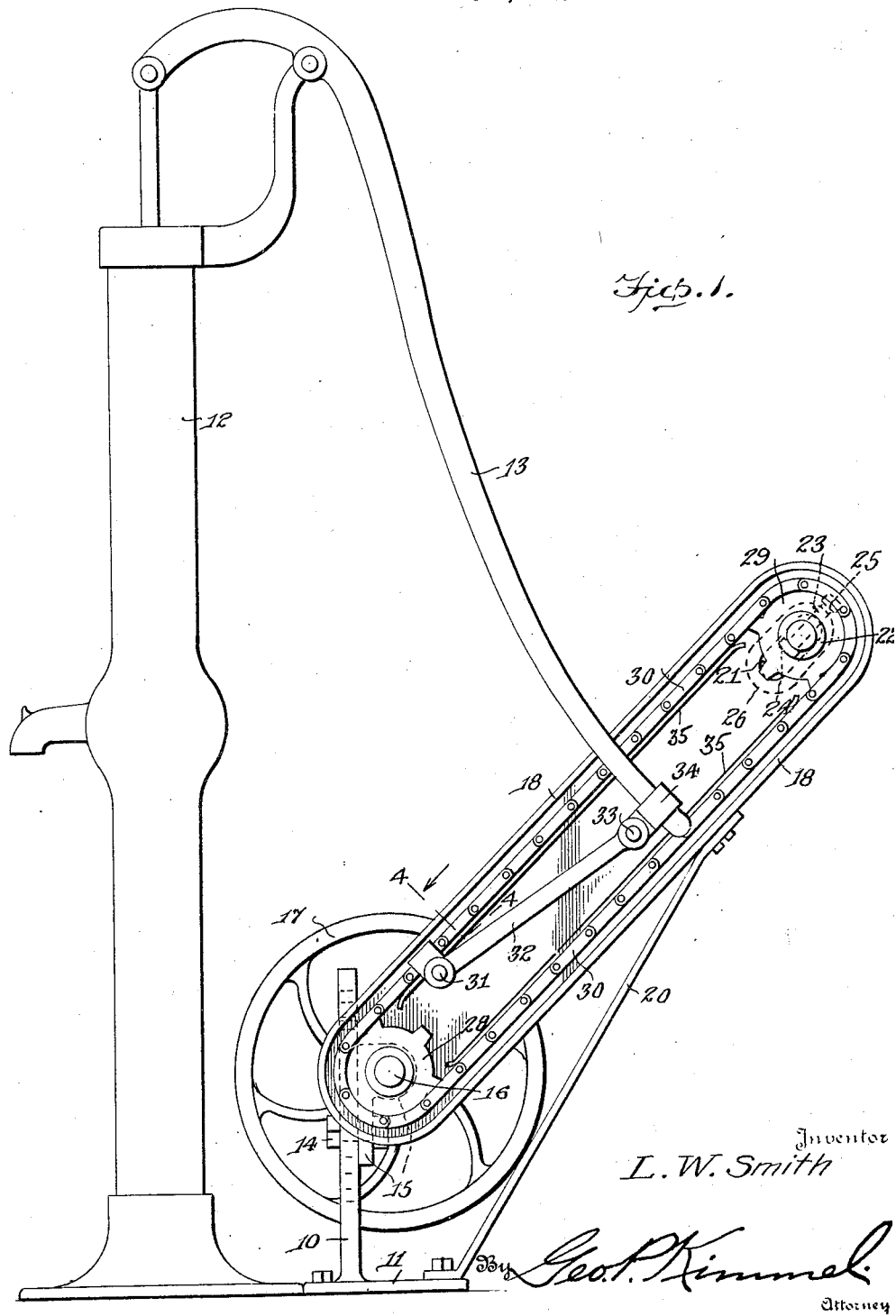

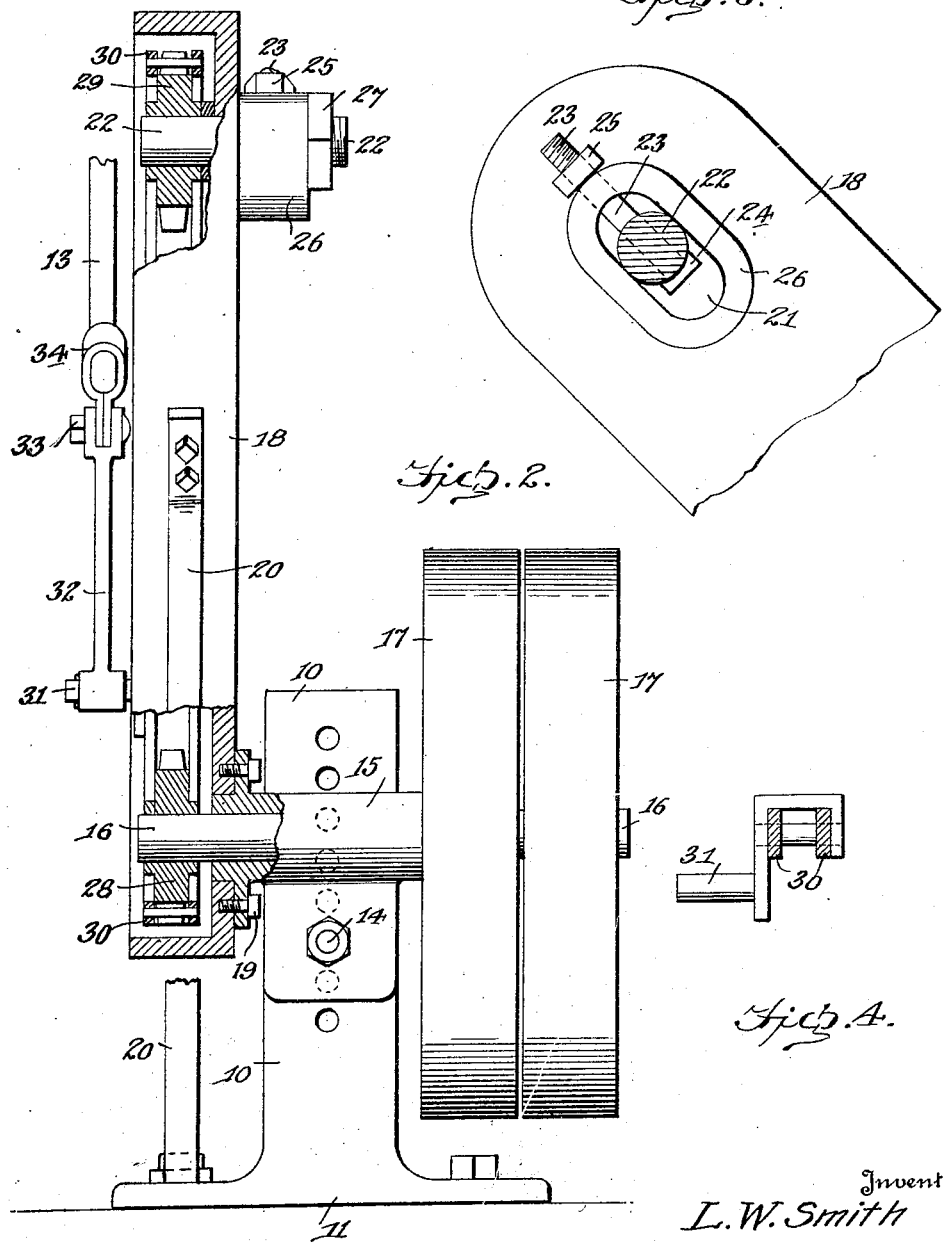

1,541,597

UNITED STATES PATENT OFFICE.

LON W. SMITH, OF MAROA, ILLINOIS.

PUMP-OPERATING APPARATUS.

Application filed May 2, 1923. Serial No. 636,274.

*To all whom it may concern:*

Be it known that I, LON W. SMITH, a citizen of the United States, residing at Maroa, in the county of Macon and State of Illinois, have invented certain new and useful Improvements in Pump-Operating Apparatus, of which the following is a specification.

This invention relates to pump operating devices, and commonly known as pump jacks, and has for one of its objects to simplify and improve the construction and increase the efficiency and utility of devices of this character.

Another object of the invention is to provide a device of this character capable of being adjusted without material structural change or detaching any of the parts, to pumps of various forms and sizes and to pumps employed in various localities.

With these and other objects in view, the invention consists in certain novel features of construction as hereinafter shown and described and then specifically pointed out in the claim, and in the drawings illustrative of the preferred embodiment of the invention—

Figure 1 is a side elevation of the improved device applied.

Fig. 2 is an end elevation, enlarged, and partly in section.

Fig. 3 is an enlarged detail of the portion of the device for applying tension to the chain.

Fig. 4 is an enlarged detail of the chain "hitch" with the chain links in transverse section on the line 4—4 of Fig. 1, looking in the direction of the arrow.

The improved device includes a standard 10 having a lateral base 11 whereby the standard may be rigidly supported adjacent to the pump to be operated, the latter represented conventionally at 12 with the usual handle or lever 13.

Adjustably attached to the standard, for instance by a clamp bolt 14, is a bearing 15 in which the main drive shaft 16 is mounted, and provided with means for rotating it, for instance, loose and tight band pulleys 17.

A relatively long housing, represented as a whole at 18, is bolted or otherwise secured as at 19, to the bearing 15, and extends obliquely from the standard and is suitably braced as shown at 20 from the base 11 of the standard.

The housing 18 is open at one side, and formed through the closed side is a longitudinally directed slot or guideway 21, and slidably supported in the guideway is a stub shaft 22, the latter having a pull bolt 23 extending through the shaft 22 and provided with a head 24 at one end bearing against the shaft and a straining nut 25 at the other end bearing against a flange 26 projecting from the housing 18 and surrounding the guide slot 21.

The shaft 22 is held in place by a holding nut 27 bearing against the flange 26.

Chain pulleys 28 and 29 are mounted respectively on the shafts 16 and 22 within the housing 18 in position to receive an endless chain 30. The chain thus operates entirely within the housing and protected and concealed thereby.

Longitudinally directed supports 35 for the chain 30 are disposed in the housing 18, as shown.

Projecting from one of the links of the chain 30 is a stud or pin 31, and swingingly coupled at one end to this stud is a connecting rod 32, pivotally connected by a pin 33 to the other end of the rod is a sleeve or collar 34 adapted to engage the handle 13 of the pump.

By this simple arrangement, it will be obvious that when rotary motion is imparted to the shaft 16, for instance by power applied to the tight pulley 17, the chain 30 will be correspondingly rotated and transmit reciprocatory motion to the pump handle, through the action of the rod 32.

The improved device is simple in construction, can be manufactured of any suitable material and of any required size to fit any size and form of pump operated by a handle.

The preferred embodiment of the invention is disclosed in the drawings and set forth in the specification, but it will be understood that modifications within the scope of the claims may be made in the construction without departing from the principle of the invention or sacrificing any of its advantages.

Having thus described the invention, what is claimed as new is:—

A device of the class described comprising a supporting standard having a bearing sleeve formed with outwardly directed ears, a stub shaft rotatable in said bearing sleeve, a shell device attached at one end to said ears, a stud supported in said shell near the other end thereof, chain wheels mounted respectively upon said stub shaft and stud, an endless chain operative over said chain wheels, a pin extending from one of the links of said chain, a link coupled at one end to said pin and adapted to be coupled at the other end to a movable body, and means for rotating said stub shaft.

In testimony whereof, I affix my signature hereto.

LON W. SMITH.